July 8, 1969    V. E. HAMILTON    3,453,957
APPARATUS FOR PRODUCING FILTER ELEMENT
Filed Oct. 31, 1966
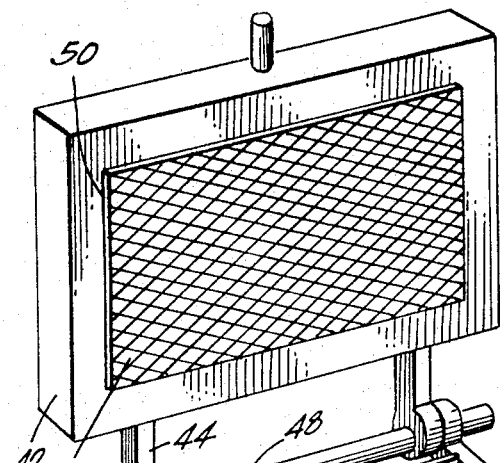
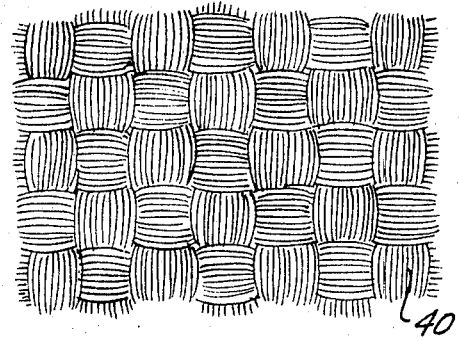
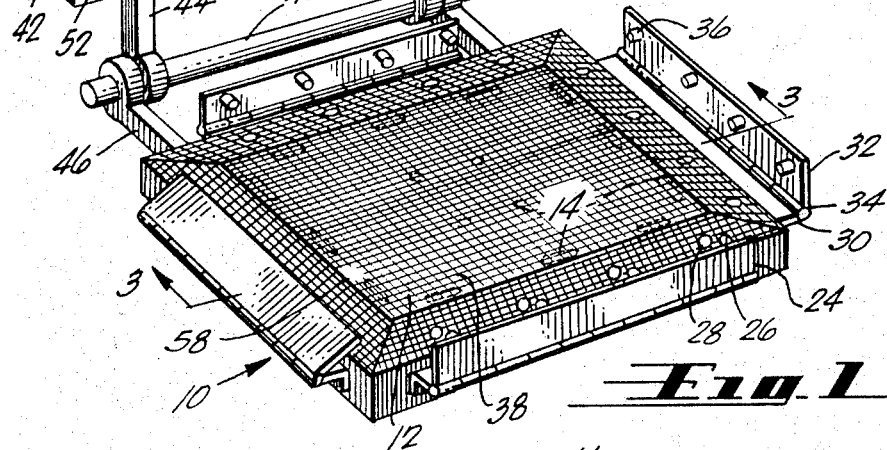
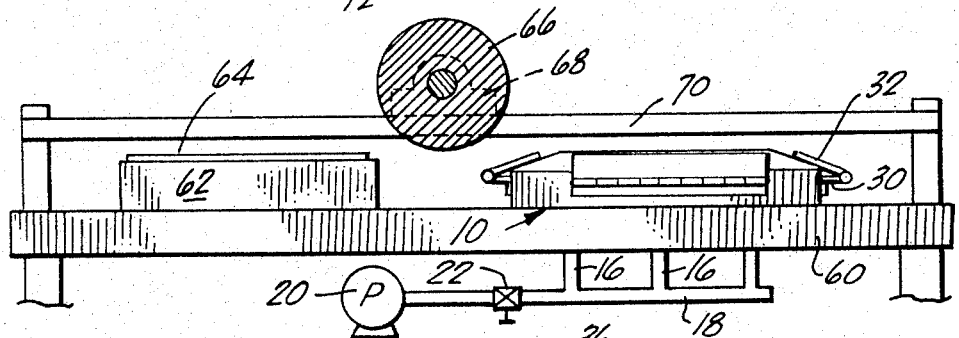
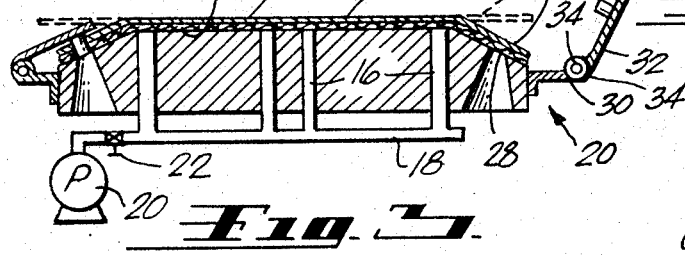
INVENTOR.
VERN E. HAMILTON
BY
Edwin Coates
—ATTORNEY—

United States Patent Office 3,453,957
Patented July 8, 1969

3,453,957
APPARATUS FOR PRODUCING
FILTER ELEMENT
Vern E. Hamilton, Palos Verdes Estates, Calif., assignor, by mesne assignments, to McDonnell Douglas Corporation, Santa Monica, Calif., a corporation of Maryland
Filed Oct. 31, 1966, Ser. No. 590,976
Int. Cl. B41f 3/20; B41l 13/00
U.S. Cl. 101—269        9 Claims

ABSTRACT OF THE DISCLOSURE

Method and apparatus include providing backing member with planar face and index punch means along margin. Suction ports in face to provide vacuum holddown. Thin flexible sheet of transparent material is laid on planar face and vacuum is pulled and repeated to remove wrinkles and stresses and to hold immovable. Punch means forms index holes in margin of sheet. Printing means prints grid on sheet in exact predetermined relation to index formations while sheet is held immovable. Planar face may be covered with fabric woven of strands of untwisted fibers to provide flat, slightly yieldable surface, and to insure uniform vacuum throughout area of face.

This invention lies in the field of printing and is directed to the problem of printing grid patterns on thin flexible sheets in exact registry relation to index holes formed in the same sheet. It has particular utility in the printing of grid patterns on filter elements which are to be laminated into space lattice type ambient light trapping filters.

The nature, construction, and use of a space lattice type filter are disclosed in my copending application for patent on Ambient Light Filter, Ser. No. 230,644, filed Oct. 15, 1962. Briefly, such device comprises a filter body of transparent material in which are embedded a plurality of filter elements having a grid pattern. Each element constitutes a tier of alternating transparent and highly light absorbing material in closely spaced relation to form a multiplicity of light transmitting apertures bordered by such light absorbing material. The grid patterns may be of various forms including but not limited to squares, rectangles and diamonds. The tiers are in parallel relation to each other and spaced depthwise of the filter body with the light transmitting apertures in registry to constitute depthwise directed viewing cells. The light absorbing material traps light rays which strike the face of the filter at angles greater than the selected viewing angle and which are refracted into the filter at reduced angles.

The grid pattern of each tier comprises narrow, extremely thin lines separated by clear areas several times the width of the lines. It has been determined that the depthwise spacing between lines should be substantially equal to the line width. The presently preferred method of producing these filter bodies is to print the grid patterns on layers of transparent plastic material having a thickness equal to the line width, stacking the desired number of layers and cementing them into a unitary body with the grid lines in depthwise registry. The registry is accomplished by providing index formations, such as punched holes, in each sheet of material and printing the grid pattern in exact relation to the index holes. The sheets are then stacked with the index holes fitted on appropriate index pins.

The earlier filters were made with lines ranging from .005 to .010 inch in width printed on sheets of corresponding thickness. These sheets were fairly rigid and little difficulty was experienced with buckling or twisting during processing. It was possible to punch index holes in the margin, mount the sheet on the backing member of a printing press with the index holes engaged by guide pins, and print the grid pattern in exact registry relation with the index holes.

It has since been determined that, in order to make the grid lines indistinguishable under normal viewing conditions, they must have a width of no more than .002 inch. This means that the sheet to be printed must be only .002 inch thick. Such a sheet is so flexible that it may be considered "flimsy." It buckles, stretches, and twists so readily that the previous methods of processing will not produce the accuracy which is necessary for the manufacture of space lattice filters.

The present invention overcomes these difficulties and provides a method and apparatus which make it possible to print these thin sheets with the same accuracy as the previous thicker and more rigid sheets. Generally stated, the printing press backing member has a planar face with an area at least as large as the grid pattern to be printed and it is provided with suction ports communicating with the planar face and a source of suction such as a vacuum pump to hold a sheet of material in place by vacuum. When the sheet is secured, the margins are overlaid on a marginal area of the backing member which is formed with index punching apertures. Punch members are then swung in place and their punch pins cooperate with the apertures to punch index holes in the margin of the sheet. While the sheet is thus held, a grid printing member prints a grid pattern on the sheet in exact relation to the index holes. Each succeeding sheet is first secured by suction, then punched, and then printed. Consequently, every sheet is exactly the same, and registry in assembly and lamination is assured.

Conventional vacuum hold-down plates cannot be used for the present purpose. Such a plate is provided with a few suction ports and suction is applied over the total area by grooves connected with the ports. The grooves may be formed by molding, machining, or etching. Two difficulties arise with such grooves. The flexible material which must be used for the filter is pulled down into the grooves, producing corresponding depressions in its outer surface sufficiently deep to cause skips in the grid pattern during printing. These skips cannot be tolerated. Moreover, the material is often drawn into the grooves to such extent as to block them and prevent the attainment of a uniform suction over the total area of the plate.

These problems are overcome by the provision of a covering for the planar face of the backing member comprising a layer of woven fabric which is secured to the face by cementing or the like. The spaces between the fibers of the strands of weaving provide air passages throughout the area to insure uniform suction. The strands or threads usually found in woven material are twisted to give resilience, prevent raveling etc. However, when facewise pressure is applied to such cloth, the twist closes the air passages and it is difficult to obtain a uniform vacuum. Hence, in the material used for the present purpose, the fibers are longitudinally parallel or untwisted to maintain the air passages open. Another advantage of the parallel fiber threads is that the fibers can spread out laterally where they overlap in the weave, reducing the effective diameters and thus the extent of the double thickness so that the fabric under pressure will be flatter and more uniform in thickness. This gives better area support to the sheet material. At the same time, the fabric is sufficiently yieldable in a depthwise direction to accommodate slight variations in the thickness of the material. Although these variations are much less than .001 inch, they are sufficient to cause printing skips when the sheet is supported on a rigid back plate.

Various other advantages and features of novelty will become apparent as the description proceeds in conjunction with the accompanying drawing, in which:

FIG. 1 is an elevational view in perspective of a printing press embodying the features of the invention;

FIG. 2 is a fragmentary plan view of the woven fabric;

FIG. 3 is a sectional view of the backing member taken on line 3—3 of FIG. 1; and FIG. 4 is a schematic side elevational view, partly in section, of a modified form of printing press.

The apparatus shown in FIG. 1 includes a backing member 10 which is preferably a rigid block of metal of generally rectangular planform having a planar face 12 which forms the backup plate of the printing press on which the length of thin, flexible, transparent plastic material is to be laid for printing. A suitable member of suction ports 14 are located around the margins and near the center of the planar face and are connected by passages 16 to conduit 18, as seen in FIG. 3, the conduit leading to a suitable source of suction, such as vacuum pump 20. Application of suction to the planar face is controlled by valve 22. The latter is shown as a manually actuated type but may be an automatic sequence type to carry out the method as subsequently described.

An index-forming section 24 may extend along one margin of the planar face but preferably extends entirely around the periphery as shown in FIG. 1. The upper surface 26 is chamfered so that it extends rearwardly away from the planar face to provide clearance for the printing member. Index-punch apertures 28 are formed in section 24 in predetermined relation to the planar face and, as seen in FIG. 3, they extend through the section 24 to its lower surface to provide exits for punchings.

To complete the punching mechanism an angle bracket 30 is mounted along the outer wall of each length of the index-forming section, and punch means in the form of an elongate plate 32 is attached to each bracket by a piano hinge 34. Punch pins 36 are attached to each plate to cooperate with apertures 28 in forming index holes in the sheet material to be printed. These pins move in a predetermined path to produce index holes which bear an exact relation to the planar face.

To complete the hold-down device a covering for the backing member is provided in the form of a layer of woven fabric 38 which is secured to the planar face and to the upper face 26 of the index-forming section 24. A very thin layer of cement is applied to faces 12 and 26 and the fabric is applied with light pressure so that only its bottom surface will pick up any cement to avoid impregnating the majority of the fibers and blocking the air passages. In order to prevent air from leaking into the hold-down area, dam means is formed around the margin of the planar face by applying a line of cement 58 sufficient to impregnate the total depth of the fabric. As will be seen in FIG. 2, the fibers 40 are longitudinally parallel or untwisted. The lack of twist insures that the longitudinal air passages between the fibers will not be blocked by the depthwise pressure applied when suction is applied to an overlying sheet. Natural fibers are preferred because they are porous, but synthetic or glass fibers may be used. As will also be noted in FIG. 2, the untwisted fibers spread out laterally where they overlap, thus producing a more uniform thickness to support the sheet over a greater proportion of its area.

The printing member includes a rectangular head 42 pivotally supported on the backing member by hinge arms 44 and 46 and hinge pin 48. The confronting face of the head carries a printing plate 50 bearing a diamond grid pattern 52, which is inked for each operation by a conventional inking roller, not shown. The pivot connection has a zero clearance fit so that the printing member will follow an exact predetermined arcuate path and produce a printed image of the grid pattern on the sheet of material in exact relation to the index apertures 28 in every operation.

The process is carried out by placing a length of flexible plastic material 54 on the backing member so that it rests on the covering 38, with its margins 56 extending over faces 26, as seen in FIG. 3. Valve 22 is opened to apply suction and pull the material into intimate contact with covering 38. If the material had any substantial rigidity, this would be sufficient. However, it has been found that the thin flexible material buckets to some extent and forms some ripples or wrinkles. They are relieved by releasing the suction. When it is applied a second time the material draws down flat and wrinkle-free but some of the materials used develop stresses which will cause later distortion of the printed grid pattern. Therefore the suction is again released and applied a third time, when the material draws down flat and both wrinkle-free and stress-free. The material is now flat and immovable on the planar surface.

Margins 56 are now smoothed down onto faces 26 and over apertures 28, and punch plates 32 are swung inward until their punch pins 36 pierce margins 56. In this position the punch plates engage the margins and further serve to hold them in position. The printing head 42 is now swung down and plate 52 prints the grid pattern. It will be seen that the pattern in every case will be in exactly the same relation to the index holes formed in margins 56. Therefore, when the printed sheets are stacked for lamination with the index holes secured on appropriate guide pins, the lines of the grid pattern will be in the desired depthwise registration.

The same backing member and attachments may be used with a roll type press such as shown in FIG. 4. In this illustration, a base 60 supports backing member 10 and also a block 62 which carries on its upper surface a plate 64 bearing the desired grid markings. An inking roller, not shown, inks plate 64 for each printing operation. A printing roller 66 is mounted for rotation in journal blocks 68 about an axis of rotation lying in a plane spaced above and parallel to the plane of planar face 12. The blocks are mounted for longitudinal movement along rails 70, and the printing roller is caused to rotate at the proper rate to roll over the sheet of material on backing member 10 and print without smudging. This is accomplished in known manner by the use of a rack and pinion, not shown, which also ensure exact printing registry. Roller 66 rolls over inked plate 64 and picks up an impression of the grid pattern. Block 62 and backing member 10 are so spaced that when roller 66 rolls over the backing member it will transfer the impression to the length of material being held thereon. The operation is the same when roller 66 carries a grid pattern printing surface and plate 64 is an inking plate.

I claim:

1. Apparatus for producing a filter element adapted to register substantially perfectly with like filter elements in laminar relation in the manufacture of space lattice type ambient light trapping filters, comprising: a backing member having a planar face to receive a length of thin, flexible, transparent material to be processed; means to produce a vacuum over the entire planar face to hold said material in intimate and immovable facewise contact therewith during a printing operation; said backing member being provided along at least a portion of the periphery of said planar face with an adjacent index-forming section bearing a plurality of index-punch apertures in fixed relation to said planar face; punch means mounted in a selected relation to said index-forming section and bearing a punch pin for each of said apertures and movable along a predetermined path to cause each punch pin to engage a corresponding aperture to produce a plurality of index holes in the overlying margin of the material; and a grid-printing member bearing a suitable grid pattern movable along a predetermined path with respect to said planar face and the index-forming means to produce on the material a representation of said grid pattern in a predetermined exact relation to the index holes in the material to insure accurate depthwise registry of the grid patterns of a plurality of lengths of material when they are laminated with their index holes in registry.

2. Apparatus as claimed in claim 1; said punch means and index-forming section lying rearward of said planar face away from said printing member to obviate interference with the printing operation.

3. Apparatus as claimed in claim 2; said grid-printing member being in the form of a cylinder having an axis of rotation lying in a plane spaced from and parallel to said planar face; said cylinder being adapted to roll across the surface of the length of material held on said planar face in light and uniform contact therewith to reproduce the grid pattern thereon.

4. Apparatus as claimed in claim 1; said punch means overlying the punched marginal portion of the material to hold it immovable during the printing operation.

5. Apparatus as claimed in claim 1; said index-forming section extending entirely around the periphery of said planar face to form a marginal frame.

6. Apparatus as claimed in claim 1; and a covering for the face of said backing member comprising a layer of woven fabric lying in facewise contact with said planar face and secured thereto; said fabric being woven of strands of untwisted yarns to provide open air passages throughout the lengths of the strands and throughout the area of the layer, and to increase the uniformity of thickness of the layer; said means to produce a vacuum including suction ports in said planar face at predetermined locations communicating with said fabric layer and through said layer with the entire planar face; and suction producing means communicating with said suction ports.

7. Apparatus as claimed in claim 12; said woven material being depthwise yieldable to accommodate slight variations in the thickness of the sheet material.

8. Apparatus as claimed in claim 12; and dam means solely at the margin of said planar face to prevent leakage of air from the surrounding area into the selected hold-down area of the fabric layer.

9. Apparatus as claimed in claim 8; said dam means means comprising cementitious material impregnating the strands of the fabric layer along a marginal line corresponding to the margin of said planar face to block the air passages.

References Cited

UNITED STATES PATENTS

| | | | |
|---|---|---|---|
| 2,619,705 | 12/1952 | Foster | 139—420 |
| 2,694,337 | 11/1954 | Anander | 269—21 |
| 2,895,706 | 7/1959 | Blatherwick | 248—363 |
| 2,956,769 | 10/1960 | Sigler et al. | 248—363 |
| 3,221,596 | 12/1965 | Hoffman | 248—363 |
| 3,221,648 | 12/1965 | Weiss | 101—126 |
| 3,335,994 | 8/1967 | Cocito | 248—363 |
| 3,359,895 | 12/1967 | Forslund | 101—407 |

ROBERT E. PULFREY, *Primary Examiner.*

E. H. EICKHOLT, *Assistant Examiner.*

U.S. Cl. X.R.

101—126, 298, 407; 248—363; 269—21

PO-1050
(5/69)

UNITED STATES PATENT OFFICE
CERTIFICATE OF CORRECTION

Patent No. 3,453,957            Dated  July 8, 1969

Inventor(s)  Vern E. Hamilton

It is certified that error appears in the above-identified patent and that said Letters Patent are hereby corrected as shown below:

Column 6, lines 3 and 6, the claim reference numeral "12" each occurrence, should read --6--.

SIGNED AND
SEALED
MAY 12 1970

(SEAL)
Attest:

Edward M. Fletcher, Jr.
Attesting Officer

WILLIAM E. SCHUYLER, JR.
Commissioner of Patents